United States Patent

[11] 3,607,472

[72] Inventor Bernard E. Douda
Bloomfield, Ind.
[21] Appl. No. 876,118
[22] Filed Nov. 12, 1969
[45] Patented Sept. 21, 1971
[73] Assignee The United States of America as represented by the Secretary of the Navy

[54] WHITE SMOKE COMPOSITION CONTAINING RED PHOSPHOROUS
5 Claims, No Drawings
[52] U.S. Cl..................................... 149/19,
149/29, 149/30, 252/305
[51] Int. Cl...................................... C06d 3/00
[50] Field of Search............................ 149/19, 29,
30; 252/305

[56] References Cited
UNITED STATES PATENTS
2,658,874 11/1953 Clay et al...................... 149/19
3,193,422 7/1965 Buck............................ 149/29
FOREIGN PATENTS
647,205 12/1950 Great Britain................ 149/29

*Primary Examiner*—Leland A. Sebastian
*Attorneys*—R. S. Sciascia, H. H. Losche and Paul S. Collignon ABSTRACT: A white smoke producing composition comprised of between 8 and 12 percent of magnesium, between 30 and 34 percent of magnesium dioxide, between 0 manganese 3 percent of zinc oxide, between 0 and 4 percent of lead dioxide, between 38 and 45 percent of red phosphorus and between 10 and 18 percent of a resinuous binder.

WHITE SMOKE COMPOSITION CONTAINING RED PHOSPHOROUS

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION

The present invention relates to a pyrotechnic composition which, when burned, will produce a dense white smoke particularly adapted for military purposes, such as signalling or camouflage, and more particularly the composition contains red phosphorus.

Chemicals in the category of screening smokes are those which, when dispersed in air, produce a cloud of finely divided particles of solid, liquid, or both. These are used to shield tactical operations or disrupt the movements of the enemy. Outstanding examples of such materials are: fuel oil used in "artificial fog" generators, white phosphorus, sulfur trioxide, titanium tetrachloride, and so called zinc chloride smokes. Each of the above-listed smoke-generating compositions is characterized by certain advantages and disadvantages in military operations, depending upon the importance of such factors as mobility of the smoke producing apparatus, toxicity, logistical considerations, and the total obscuring power of the composition employed.

For military use, volatile hygroscopic chloride (HC) smokes are the most important, other than oil mixtures, which are utilized for large scale operations. The most widely used HC types of smokes are those resulting in the production of zinc chloride smokes.

The original mixture employed to produce a zinc chloride smoke was the Berger mixture, developed by the French Army during World War I. The original Berger mixture consisted of zinc dust and carbon tetrachloride with zinc oxide and diatomite. Upon ignition, a vigorous reaction takes place, resulting in the formation of zinc chloride, which is volatilized by the heat of the reaction and solidifies to form smoke. However, since this mixture employed a liquid organic chloride, it was difficult to transport and store. By the beginning of World War II, the United States Government had developed a mixture designated "HC smoke mixture" which contained zinc, a perchlorate as an oxidizing agent, hexachloroethane as the organic chloride compound, with a retarder, ammonium chloride. Subsequently, a mixture was found which was better in many ways than the original; it was a combination of hexachloroethane, aluminum and zinc oxide. This mixture required no stabilizer against moisture absorption, and changing the percentage of aluminum varied the burning time, as desired. However, these compositions are corrosive and will interfere with firing mechanisms, thereby materially limiting the storage life of the smoke-generating composition.

SUMMARY OF THE INVENTION

The present invention relates to a smoke-producing composition which can be made into smoke candles and more particularly to a pyrotechnic composition for making smoke candles by a tamp-cast method. The composition is comprised of a fuel, such as magnesium, red phosphorus, oxidizing materials, and from about 12 to 14 percent of a resinous binder such as epoxy or an epoxy-polyglycol system.

DESCRIPTION OF THE PREFERRED EMBODIMENT

The present invention relates to a pyrotechnic composition for producing candles which, when burned, produce a dense white smoke, and the composition is suitable for making smoke candles by a tamp-cast method, as opposed to a pressed method which has heretofore been used to make all red phosphorus smoke candles used by the various military departments. Magnesium is used as a fuel and the composition contains from about 38 to 45 percent of red phosphorus. While it is desirable to get as much red phosphorus as possible into a smoke candle, presently there is available in the United States only one form of red phosphorus and this is a very finely ground material, that is, it has a very small average particle size. Accordingly, available red phosphorus has a high surface area per weight of material and a large amount of binder is normally needed to wet the red phosphorus. If smoke candles are to be made by a pressed method, as little as 3 or 4 percent of binder might be employed. On the other hand, if candles are to be made by a pure cast method, it is necessary, because of the fine red phosphorus available, to go to a very high percentage of binder, such as between 25 and 30 percent. Such a high percentage of binder however, reduces the amount of red phosphorus in the system and is undesirable. In the present invention, a tamp-cast method is employed in making smoke candles and the resinous binder is in the range of from 10 to 18 percent.

The following examples are provided in order to illustrate the present invention.

EXAMPLE I

|  | PERCENT (By Weight) |
|---|---|
| Magnesium (granulation 12) | 11 |
| Manganese dioxide | 34 |
| Zinc Oxide | 3 |
| Red phosphorus | 38 |
| Polyglycol Resin (QX-3812) | 8.68 |
| Epoxy Resin (D. E. R. 732) | 5.32 |

The magnesium particles were of granulation 12, as defined in Mil-Spec JAN-M-382, entitled, "Magnesium Powder For Use In Ammunition." The polyglycol and epoxy resins were obtained from The Dow Chemical Company, Midland, Michigan. The epoxy resin used is marketed by The Dow Chemical Company under the trademark D. E. R. 732 and is a flexible epoxy resin. The polyglycol resin is a perchlorate-modified amine-terminated long chain polyglycol and The Dow Chemical Company designates the resin as QX-3812. This polyglycol resin is an amber liquid having a specific gravity of 1.05 at 25° C. and has the following analysis:

|  | PERCENT (By Weight) |
|---|---|
| Carbon | 59.10 |
| Hydrogen | 10.20 |
| Oxygen | 28.05 |
| Chlorine | 1.36 |
| Nitrogen | 1.29 |

After the ingredients were mixed and blended the composition was poured and tamped to form a smoke candle about 1.76 inches in diameter and about 2.75 inches long. The smoke candle weighed 190 grams and had a density of 1.74 g./cm$^3$. After curing, the smoke candle was ignited and burned for 180 seconds. A dense, white smoke was produced.

EXAMPLE II

|  | PERCENT (By Weight) |
|---|---|
| Magnesium (granulation 12) | 11 |
| Manganese dioxide | 30 |
| Zinc oxide | 3 |
| Lead dioxide | 4 |
| Red phosphorus | 38 |
| Polyglycol resin (QX-3812) | 8.68 |
| Epoxy resin (D. E. R. 732) | 5.32 |

The addition of lead dioxide provides an increase in the burning rate of the composition. As spontaneous ignition can occur when mixing lead dioxide with red phosphorus, special precaution must be taken when mixing these two ingredients. The red phosphorus was first mixed with the binder and thoroughly wetted before the lead dioxide and other ingredients were added. Also the percentage of lead dioxide must be kept low.

After the ingredients were mixed, the composition was poured and tamped to form a smoke candle about 1.76 inches in diameter and about 2.81 inches long. The smoke candle weighed 190 grams and had a density of 1.72 grams/cm$^3$. After curing, the smoke candle was ignited and burned for 185 seconds. A dense, white smoke was produced.

EXAMPLE III

| | PERCENT (By Weight) |
|---|---|
| Magnesium (granulation 12) | 10 |
| Manganese dioxide | 34 |
| Red phosphorus | 42 |
| Polyglycol resin (QX–3812) | 8.68 |
| Epoxy Resin (D. E. R. 732) | 5.32 |

The ingredients were blended as in EXAMPLE I and then poured and tamped to form a smoke candle about 1.76 inches in diameter and about 2.38 inches long. The smoke candle weighed 195 grams and had a density of 2.03 grams/cm$^3$. After curing, the smoke candle was ignited and burned for 250 seconds. A dense, white smoke was produced.

EXAMPLE IV

| | PERCENT (By Weight) |
|---|---|
| Magnesium (granulation 12) | 10 |
| Manganese dioxide | 30 |
| Lead dioxide | 4 |
| Red phosphorus | 42 |
| Polyglycol resin (QX–3812) | 8.68 |
| Epoxy resin (D. E. R. 732) | 5.32 |

The ingredients were mixed as in example II and then poured and tamped to form a smoke candle about 1.76 inches in diameter and about 2.25 inches long. The smoke candle weighed 182 grams and had a density of 2.02 grams/cm$^3$. After curing, the smoke candle was ignited and burned for 223 seconds. A dense, white smoke was produced.

EXAMPLE V

| | PERCENT (By Weight) |
|---|---|
| Magnesium (granulation 12) | 12 |
| Manganese dioxide | 30 |
| Lead dioxide | 4 |
| Red phosphorus | 40 |
| Epoxy resin | 9.52 |
| Curing agent | 4.48 |

The epoxy resin used was a general purpose liquid resin and was obtained from The Dow Chemical Company, Midland, Michigan, under the trade name D. E. R. 321. The curing agent was also obtained from The Dow Chemical Company and was a low-viscosity aliphatic diamine which is sold under the trade name D. E. H. 31. The ingredients were blended as in example I and then tamped to form a smoke candle about 20 inches in diameter and about 17.5 inches long. The smoke candle weighed 147,550 grams and had a density of 1.92 grams/cm$^3$. After curing, the smoke candle was ignited and burned for 120 seconds. In order to facilitate the rapid burning of the candle, 19 holes each about 1 ½ inches in diameter were made in the candle. Upon burning, a dense, white smoke was produced.

I claim:

1. A white smoke-generating composition comprised, by weight, of
   between 8 and 12 percent of magnesium,
   between 30 and 34 percent of manganese dioxide,
   between 0 and 3 percent of zinc oxide,
   between 0 and 4 percent of lead dioxide,
   between 38 and 45 percent of red phosphorus, and
   between 10 and 18 percent of a resinous binder.

2. A white smoke-generating composition as set forth in claim 1 wherein said resinous binder is selected from the group consisting of epoxy resin and epoxy-polyglycol resin.

3. A white smoke-generating composition as set forth in claim 1 wherein said resinous binder is epoxy resin.

4. A white smoke-generating composition as set forth in claim 1 wherein said resinous binder is epoxy-polyglycol resin.

5. A white smoke-generating composition as set forth in claim 4 wherein said resinous binder is comprised, by weight, of about 62 percent of polyglycol resin and about 38 percent of epoxy resin.